United States Patent [19]

Brewer et al.

[11] Patent Number: 5,019,307

[45] Date of Patent: May 28, 1991

[54] METHOD AND APPARATUS FOR THE MANUFACTURE OF HOLLOW CERAMIC BEAMS USING MULTIPLE MOLDING MANDRELS

[75] Inventors: John R. Brewer, Hillsboro; Joseph M. Swenson, Forest Grove; Reginald R. Maas, Newberg, all of Oreg.

[73] Assignee: Coors Ceramic Company, Golden, Colo.

[21] Appl. No.: 319,652

[22] Filed: Mar. 3, 1989

[51] Int. Cl.$^5$ .................................................. C04B 35/64
[52] U.S. Cl. ........................................ 264/67; 264/56; 264/71; 264/313; 264/317
[58] Field of Search ................... 264/56, 67, 313, 317, 264/71

[56] References Cited

U.S. PATENT DOCUMENTS 3,499,066  3/1970  Murray ................................. 264/56
3,502,755  3/1970  Murray ................................. 264/56

Primary Examiner—James Derrington
Attorney, Agent, or Firm—Klarquist, Sparkman, Campbell, Leigh & Whinston

[57] ABSTRACT

A method and apparatus for the manufacture of hollow ceramic beams are described using a plurality of substantially parallel spaced mandrels mounted within a flexible mold bag which is filled with ceramic forming powder and compressed within an isostatic press to produce a compressed body of powder. A sliding spacer shoe slides along the mandrels during filling as the powder is vibrated for compaction to maintain the mandrels in a predetermined spaced relationship. The mandrels are removed from the compressed body and it is machined to the proper dimensions before firing in a kiln to sinter the body into a hollow ceramic beam. The ceramic beam includes internal support partitions formed integral with the outer walls of the beam by web portions of the body produced between the mandrels. A pair of end pads of rigid, high density foam, such as polyurethane, are positioned over the opposite ends of the mandrels to inhibit the flow of ceramic powder into the gaps between the ends of the mandrels during pressing in order to provide uniform compression of powder in the web portions between the mandrels. Release pads of elastomer material are provided between end pads from the compressed body when the pressure is reduced to normal after pressing.

11 Claims, 2 Drawing Sheets

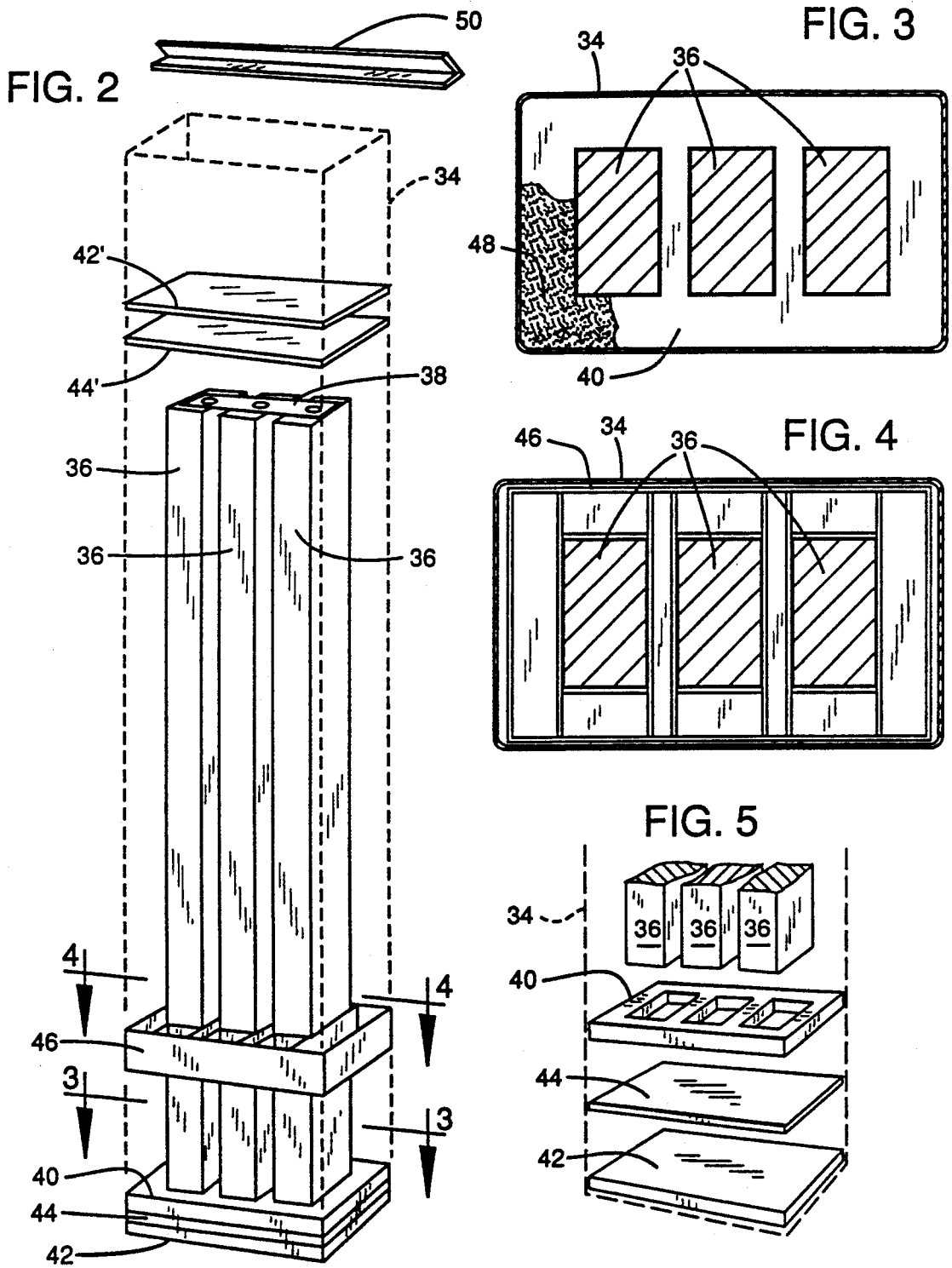

METHOD AND APPARATUS FOR THE MANUFACTURE OF HOLLOW CERAMIC BEAMS USING MULTIPLE MOLDING MANDRELS

BACKGROUND OF THE INVENTION

The subject matter of the present invention relates generally to the manufacture of hollow ceramic articles, such as beams, by molding them as one piece using a flexible mold and molding mandrels and, in particular, to a method and apparatus for the manufacture of hollow ceramic beams using multiple molding mandrels. The mandrels are placed within a flexible mold and mounted in a predetermined spaced relationship so that a mixture of ceramic-forming powder poured into the mold fills the mold including the spaces between the mandrels and the mandrels are allowed to move laterally during pressing. By pressing the mold in an isostatic press to form a compressed body of such ceramic powder in the shape of a hollow beam, internal support partitions are formed between the mandrels as part of the compressed body. After the mandrels are removed from the compressed body, such body is fired to sinter the ceramic powder into a hollow ceramic beam having internal support partitions formed integral with the outer wall of the beam. These support partitions prevent the walls from sagging downward due to gravity during firing (hereafter called "slumpage").

Isostatic pressing of a mixture of ceramic-forming powder in a flexible mold of rubber to provide a pressed body of powder which is subsequently machined to the proper dimensions and then fired to sinter the body into a ceramic article has been used to manufacture solid and hollow ceramic articles as described in *Elements of Ceramics* by F.H. Norton, pages 109–110, 2nd edition, published 1974 by Addison-Wesley Publishing Co. of Menlo Park, California.

As described in U.S. Pat. No. 3,824,051 of Van Leemput issued July 16, 1974, it has previously been the practice in the manufacture of hollow ceramic articles by pressing in a mold to employ a single molding mandrel which is mounted within a flexible mold to form a compressed body of ceramic-forming material in an isostatic press. When hollow ceramic beams are manufactured in this manner to provide a hollow compressed body having no internal partitions that is fired in a kiln to sinter the ceramic, the high temperature causes slumpage of the body which tends to bend the walls of the beam downwardly, resulting in deformity of the beam. Heretofore, it has been proposed to provide separate ceramic support plates which are positioned within the hollow pressed body before sintering in order to prevent collapse of the wall during firing of the pressed body. However, this has the disadvantage that there may be a discontinuity between the density of the internal support plate and that of the inside surface of the beam at its interface with the plate. The inside surface of a hollow pressed beam may have a reduced density from that of a tri-axially pressed solid body because of the effect of the friction forces between the hollow ceramic body and the mandrel. These friction forces include compression of the body vertically along the length of the mandrel, thus producing a bi-axial horizontal compression which may not produce the high densities achieved with tri-axial compression. The amount of shrinkage that a ceramic body undergoes is dependent on density among other things. Since the internal ceramic support plates adhere to the walls of the ceramic beam, the above-described difference in density causes a difference in shrinkage, which will result in strain in the internal ceramic support plate and the hollow pressed beam. The resulting tensile strain may be sufficient to cause failure during the sintering process.

In an effort to avoid discontinuities in beam density and to improve manufacturability it was decided to utilize multiple parallel mandrels. These mandrels would be placed inside the press bag in such a position as to allow ceramic body to flow with the gap between two mandrels to form the desired support web. However, difficulties were experienced when this was attempted, including cracks in the isostatically pressed beams. It appears that these cracks were the result of non-uniform web compression which caused bowing of the mandrels during compression. Upon release of the isostatic pressure, the mandrels attempt to elastically return to their prepressed shape, resulting in strain in the mandrels and in the pressed beam body. The tensile strain is often sufficient to fracture the pressed beam body. The non-uniform compression of the web between the mandrels is caused by more additional ceramic powder flowing into the web area near the ends of the beam than near the center of the beam once isostatic compression has begun. The web portions near the ends of the mandrels are exposed to compression forces parallel to the mandrels as well as compression forces normal to the mandrels. However, friction between the mandrels and the ceramic body restricts the compressive forces parallel to the mandrels in the web near the center of the mandrels resulting in only normal compressive forces near the center of the web.

SUMMARY OF INVENTION

It is, therefore, one object of the present invention to provide an improved method and apparatus for the manufacture of hollow ceramic beams using multiple molding mandrels to provide internal support partitions formed integral with the beam to enable the outer wall of the beam to be thinner and to enable a beam of greater cross-section and/or less weight to be constructed.

A further object of the invention is to provide such an improved method and apparatus for the manufacture of hollow ceramic beams in which a sliding spacer means is provided within a flexible mold bag for sliding along the mandrels to maintain the mandrels in a predetermined, spaced relationship while the mold is being filled with ceramic-forming powder, such spacer means sliding upward to allow filling of the mold with the powder while maintaining such spaced relationship.

An additional object of the invention is to provide such a method and apparatus in which the flow of ceramic-forming powder in a direction longitudinal of the mandrels is inhibited by end pads at the opposite ends of such mandrels while allowing the mandrels to move laterally during pressing.

Still another object of the invention is to provide such a method and apparatus for producing a hollow compressed powder body of substantially uniform density which includes at least one internal support partition formed integral with such body.

A still further object of the invention is to provide such a method and apparatus for the manufacture of hollow ceramic beams in which the ends of the mandrels are spaced from the mold bag by end pads of rigid, high-density foam material and by release pads of resilient elastomer material positioned between such end pads and the ends of the mandrel to enable release of the end pads from the compressed body without damage to the body when pressing is completed and the pressure reduces to normal.

A still additional object of the invention is to provide such a method and apparatus in which a locator pad of elastomer material having openings for receiving the lower ends of the mandrels is placed within the mold bag to locate such mandrel ends and maintain them in proper spaced relationship during filling of the mold with powder and vibration of such powder while allowing lateral movement of the mandrels during pressing for reducing the stress in the compressed body formed during pressing.

Other objects and advantages of the present invention will be apparent from the detailed description of a preferred embodiment thereof and from the attached drawings of which:

BRIEF DESCRIPTION OF THE DRAWINGS

FIG. 2 is an oblique elevation view showing the resilient mold bag and the mandrels as they are mounted within such bag in accordance with the present invention, such mold bag being shown in phantom outline for clarity;

FIG. 3 is a horizontal section view taken along the line 3—3 showing the cross section of the mandrels and their spaced relationship within the mold bag as it is being filled with ceramic-forming powder;

FIG. 4 is a horizontal section view taken along line 4—4 of the sliding spacer means or fill shoe which maintains the mandrels in predetermined spaced relationship while allowing filling of the mold bag through such spacer as it slides along the length of the mandrels; and FIG. 5 is an exploded view of the mounting pads at the bottom end of the mold bag and mandrel assembly.

DESCRIPTION OF PREFERRED EMBODIMENT

Figure 1:
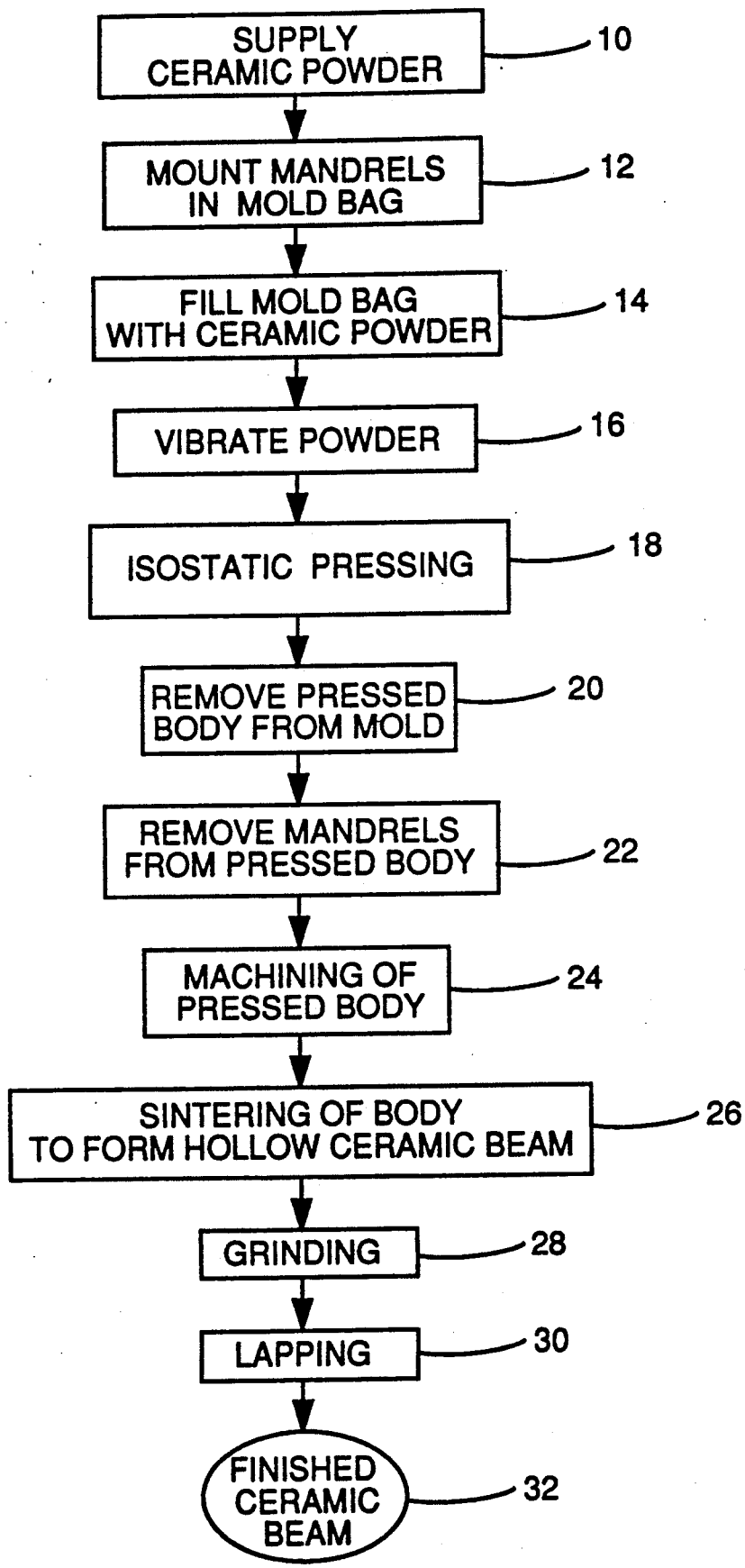
FIG. 1 is a diagrammatic flow chart of the method steps used in the method of the present invention.

As shown in FIG. 1, one embodiment of the method of manufacture of a hollow ceramic beam in accordance with the present invention includes a first step 10 of supplying ceramic-forming powder which may be a mixture of materials used to form any suitable ceramic such as aluminum oxide ($Al_2O_3$) ceramic. A second step 12 includes mounting mandrels within a mold bag of elastomer material. The third step 14 involves filling the mold bag containing the mandrels with the ceramic-forming powder. A fourth step 16 may include vibrating the powder both during filling and after filling to compact the powder within the mold. In a fifth step 18, isostatic pressing is used to compress the powder in the mold inwardly toward the mandrels with water or other liquid at a pressure on the order of 4,000–15,000 pounds per square inch in a conventional isostatic press. After pressing for a sufficient time, to compress the powder body to the proper density, the liquid pressure is relieved.

The pressed body of powder is then removed from the mold in step 20. Next, the mandrels are removed from the pressed body in step 22. The pressed body is then machined in step 24 to the proper dimensions, taking into account shrinkage during firing. The machined, compressed body of powder is then fired at a maximum temperature above about 1,500° C. and typically 1,650° C. for $Al_2O_3$ ceramic to sinter the powder into ceramic material and thereby produce a hollow ceramic beam which includes internal support partitions formed integral with the outer wall of such beam. The internal support partitions are provided by the powder body portions which fill the spaces between the mandrels. The sintered ceramic beam is then ground in a conventional manner on a diamond wheel or other abrasive grinding machine in step 28 and then lapped to a smooth surface finish in step 30 to provide a finished hollow ceramic beam in the final step 32 of the process. Details of the individual steps will now be described.

The ceramic-forming powder supplied in step 10 is provided by spray drying a mixture of ceramic particles and organic binders in a conventional manner. For example, an aluminum oxide ceramic having greater than 85 percent aluminum oxide content, and preferably 96 percent aluminum oxide, may be used as the ceramic material of the beam. The ceramic-forming mixture is spray dried under controlled conditions to yield a flowable powder of the proper particle size and appropriate density.

The mounting of the mandrels in the mold bag of step 12 is shown in greater detail in FIG. 2. A mold bag 34 of elastomer material, such as rubber, is used having a closed bottom end and an open top end with a generally rectangular cross-sectional shape. A plurality of rigid mandrels 36 of metal, such as aluminum or steel, are mounted within the mold bag.

In the specific example shown in FIG. 2, three mandrels 36 of rectangular cross-section are provided and are secured at their top ends by screws to a steel top strap 38 which holds such mandrels in proper spaced relationship at such top end. The bottom ends of the mandrels are inserted through the upper end of the mold bag 34 supported inside a metal carrier (not shown) and into openings of similar shape in a locator pad 40 of resilient elastomer material such as rubber to position such bottom ends in proper spaced relationship at the bottom of the mold bag so that such mandrels are substantially parallel. The locator pad is of elastomer material to allow movement of each of the mandrels in a lateral direction substantially perpendicular to its longitudinal axis during pressing. The locator pad 40 is optional and need not be used if the sliding spacer 46 performs the mandrel spacing function with sufficient positioning accuracy. An end pad 42 of rigid cross-linked urethane foam having a density of about 4 to 8 lbs./ft.$^3$ or other rigid high density plastic foam material is provided across the lower ends of the mandrels 36 at the bottom of the mold bag to inhibit the flow of powder into the gaps between such ends during pressing to provide a compressed body of more uniform density. A release pad 44 of elastomer material such as rubber is positioned between the end pad 42 and the locator pad 40 in order to cause the end pad to release from the molded powder body when pressing ceases and the pressure reduces to normal. This prevents damage of the molded body by the spring-back of the end pad 42, Because of its porosity the end pad 42 is susceptible to the ceramic powder being pressed into its interfacing surface if it is not separated from the molded body by the release pad.

As shown in FIGS. 2 and 4, a sliding spacer means or fill shoe 46 in the form of an open plastic or steel member is positioned within the mold and has three rectangular openings which fit around the lower ends of the mandrels so that it may slide upwardly along such mandrels as the mold is filled with ceramic-forming powder in step 14. The spacer maintains the mandrels in proper spaced relationship during the filling of the mold bag with ceramic-forming powder 48. The spacer 46 has other openings therein which allows the powder to fall through the spacer into the bottom of the bag through such spacer. Thus the ceramic-forming powder 48 fills the mold bag, including the spaces between the mandrels 36 and between such mandrels and the bag, as shown in FIG. 3.

While the mold bag is being filled with powder, the mold and/or the mandrels may be vibrated to compact the powder. Thus, the bag may sit on a vibrating shaker table so that both the mold bag and the mandrels are vibrated, both during filling and after filling for further compaction of the powder. Next, the tie strap 38 and fill shoe 46 are removed and additional powder is poured into the bag up to the upper ends of the mandrel. After this, the upper release pad 44' and end pad 42' are inserted into the top of the bag.

The filled bag is then sealed at its top end with a steel bar clamp 50. The sealed bag, which is water-tight, is then lifted by lifting rings on the carrier and placed within an isostatic press. A uniform liquid pressure is applied to the mold bag to press the bag and powder contained therein inward toward the mandrels in a conventional manner in step 18 with a pressure force on the order of about 4,000 to 15,000 psi. Isostatic pressing has the advantage of three-dimensional compression in that it compresses the powder in three mutually perpendicular axes for more uniform density. A compressed powder body having a density typically of approximately 0.085 lbs./in.$^3$ is produced by such pressing step.

After pressing the mold bag to form a compressed body of ceramic-forming powder, the pressure is released and such body is removed from the mold bag in step 20 after such mold is lifted out of the isostatic press. Next, the mandrels are removed from the pressed body, as shown in Step 22. This may be facilitated by making the mandrels of a tapered shape whose cross-section section area reduces in size along their length so that they are of smaller cross-section at their lower end than at their upper end. For example, a mandrel of approximately 105 inches long has an upper end cross-section of 3.760 inches by 2.635 inches and a bottom end cross-section of 3.660 inches by 2.535 inches. Thus, over the 105-inch length of the mandrel, there is a typical taper of 0.050 inch per side in both horizontal dimensions.

It should be noted that the upper end pad 42' and the upper release pad 44' are of similar construction and operate in a similar manner to the lower end pad 42 and the lower release pad 44. However, such upper pads are not put into place until the mold is filled, at which time the steel top strap 38 and fill shoe 46 are removed so that the upper ends of the mandrels are then held in place by the powder filling between such mandrels. The end pads function to inhibit flow of the powder in the longitudinal direction into the gaps between the ends of the mandrels during the pressing step and thereby produce a more uniform compression of the web thickness.

During pressing, the mandrels move in a lateral direction substantially perpendicular to the longitudinal axis of the mandrels. This is enabled by the end pad and the release pad which only contact the ends of the mandrels and do not prevent such lateral movement. In addition, the optional locator pad at the bottom end, while provided with openings into which the mandrels are inserted, does not restrict lateral movement of the mandrels because it is made of rubber or other elastomer material. This is important to prevent stresses from being created in the compressed body of powder during the pressing step caused by bending of the mandrels in the event their movement is restricted.

The problem of uneven flow of ceramic powder into the web area and resulting nonuniform compression is hereafter discussed. When a plurality of parallel mandrels are inserted into a mold bag and surrounded by ceramic powder during the pressing operation, more powder flows into the gaps between the mandrels near the end of the mandrels than flows near the center of the mandrels. Such variation in powder flow is apparently due to reduction in axial compressive force due to friction along the mandrels. Such flow variation prevents uniform compression of the partition portion or web of the body between the mandrels, causing the web near the end of the mandrels to be filled with more ceramic powder than the web portion near the center of the mandrels. This tends to cause the mandrels to bend due to compression during the pressing step and when pressure is released at the end of the pressing step, it will produce a strain in the formed part which may be sufficient to fracture the pressed part. The solution to this problem, provided by the present invention, was the use of the end pads to make the beam look infinitely long so that compression in a horizontal plane at the ends matches the horizontal compression near the middle of the mandrel. A significant percentage of the final density is achieved at relatively modest pressures during pressing in the isostatic press. Thus, the end pad, which is in the form of a rigid, high density plastic foam at the end of the mandrel, inhibits the axial flow of powder during the initial stages of compression. The density of the foam end pad is about 4 to 8 lbs./ft.$^3$ and is limited by the abrasion resistance of the rubber bag because, otherwise, such end pads will quickly wear a hole through the bag. In order to provide more uniform compression in the web area along the length of the beam in the method of the present invention, the flow of the ceramic powder is inhibited at the ends of the mandrel during pressing by means of the end pads. One suitable rigid foam material is a polyurethane foam of type FR3704. The end pads have a thickness of approximately ½ inch for a pad of a rectangular cross-section of 8.380 inches by 13.380 inches, as shown in FIG. 5. Such end pads are not resilient foam, but are crushed during pressing and thrown away after one compressed powder body is formed.

Another problem, however, is created by the end pad because of its rigid foam construction which gives it a significant "spring back" characteristic which tends to damage the molded body when pressure is reduced to normal at the end of the pressing step. To overcome this problem, the release pad of low durometer, soft resilient rubber is utilized between the mandrel and the end pad to protect the compressed powder body and prevent the end pad from breaking up the end of the body within the mold in the press. The release pad 44 is of a resilient elastomer material such as rubber, having a thickness of approximately 3/16 inch. As discussed previously, the release pad is positioned between the end of the mandrels and the end pads 42 and 42' in order to facilitate the release of the compacted powder body from the end pads when the pressing step is completed and pressure is reduced. The optional locator pad 40 is also made of a resilient elastomer material such as rubber having a thickness of approximately ⅜ inch. Such locator pad is provided with three rectangular openings which conform to the bottom ends of the mandrels 36 to uniformly space such mandrels apart and to space them a predetermined distance from the mold bag as shown in FIG. 5. Thus, by mounting the mandrels within the mold bag, the resilient locator pad 44 also enables lateral movement of the mandrels during pressing to prevent bending of the mandrels and resulting stress from being created in the compressed body when pressing stops and the pressure reduces to normal.

It should be noted that a perforated rectangular metal carrier (not shown) supports the mold bag 34 of elastomer material in a conventional manner. Such support carrier is provided with a plurality of openings which allow the liquid under pressure within the isostatic press to be transmitted through such container to the mold bag and to compress it inwardly. The exact dimensions of the ceramic beam are not produced by the mold bag during pressing but, rather, by machining prior to sintering in step 24. Thus, it is only necessary that the pressed body be of substantially the same shape and of slightly larger size than the finished body after machining in order to produce a hollow ceramic beam of the proper dimensions. This machining is easy to perform because the compressed body is not yet sintered into ceramic material so it can be easily machined by milling, drilling, or any other mechanical machining techniques.

The sintering step 26 takes place in a kiln at a high temperature on the order of 1,500 C or greater, depending upon the ceramic material being used, at a controlled time and temperature cycle in a conventional manner.

After sintering, the hollow ceramic beam is further processed by the grinding Step 28 using diamond grinding techniques in a conventional manner to provide the beam with the proper finished size. Lapping of the beam in Step 30 may be necessary to provide a surface finish of extreme flatness and smoothness by employing an abrasive slurry which is applied as a thin film between the ceramic beam surface and the hard abrasive surface of the lapping machine, again in a conventional manner. The resulting $Al_2O_3$ ceramic beam has a length up to 90 inches and a wall thickness on the order of ⅛ to ⅜ inch. This is possible because of the internal support partitions which are formed integral with the outer wall of the ceramic beam. Of course, it is desirable to make such ceramic beams with as thin walls as possible in order to reduce weight and save material. Thus, the internal support partitions strengthen the outer wall and prevent sagging during sintering so that a thin outer wall can be employed down to ⅛ inch or less.

It will be obvious to those having ordinary skill in the art that many changes may be made in the above-described preferred embodiment of the present invention without departing from the spirit of the invention. For example, other ceramic materials than aluminum oxide can be employed such as zirconium oxide. Therefore, the scope of the present invention should be determined by the following claims.

We claim:

1. A method of manufacture of hollow ceramic beams, comprising the steps:
   providing a flexible mold for forming the beams;
   mounting a plurality of rigid mandrels in substantially parallel spaced relationship within said mold with spacer means separating said mandrels;
   filling the mold with ceramic-forming powder around said mandrels and moving the spacer means during filling to maintain said spaced relationship so that the mandrels are separated by a portion of said powder;
   pressing said mold inwardly with substantially uniform pressure to compress said powder against the mandrels and thereby form a compressed body of powder surrounding said mandrels which are separated by at least one partition portion of said body;
   removing said body from said mold;
   removing said mandrels from said body to leave a hollow compressed body; and
   firing said hollow compressed body to sinter the material of said body into a hollow ceramic beam having an outer wall and at least one internal support partition formed integral with the outer wall of said beam.

2. A method in accordance with claim 1 in which the spacer means is removed from the mold before pressing and the mandrels are resiliently mounted in said mold to allow lateral movement of the mandrels during pressing.

3. A method in accordance with claim 1 in which the pressing step is performed by liquid pressure in an isostatic press.

4. A method in accordance with claim 1 in which the beam is made of $Al_2O_3$ ceramic.

5. A method in accordance with claim 1 in which the mold is made of elastomer material and the mandrels are made of metal.

6. A method in accordance with claim 1 which also includes vibrating the powder before pressing.

7. A method in accordance with claim 1 which also includes the step of machining the compressed body to the proper size before the firing step.

8. A method in accordance with claim 1 in which the firing step is performed in a kiln.

9. A method in accordance with claim 1 in which three mandrels are mounted within the mold which is filled with ceramic-forming powder so that said mandrels are separated by two partition portions of the compressed body, and after firing the ceramic beam has two internal support partitions formed integral with the outer wall of the beam.

10. A method in accordance with claim 1 in which the spacer means is a spacer member having openings therein to allow said mandrels and said powder to pass therethrough as the spacer member is moved during filling of the mold.

11. A method in accordance with claim 1 in which the mounting also inhibits the flow of ceramic-forming powder in a direction longitudinal of the mandrels while allowing the mandrels to move laterally during pressing.

* * * * *